(No Model.)
H. E. DEY.
SECONDARY BATTERY.
No. 406,822. Patented July 9, 1889.
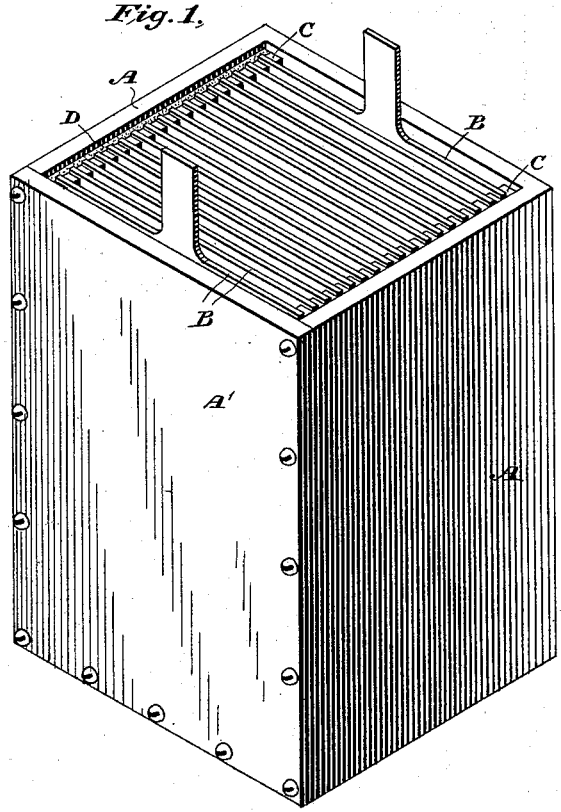
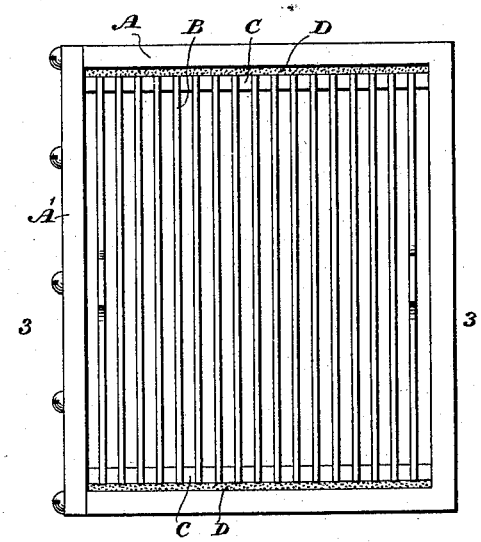
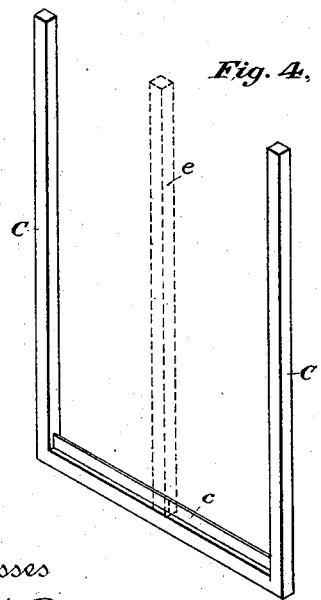
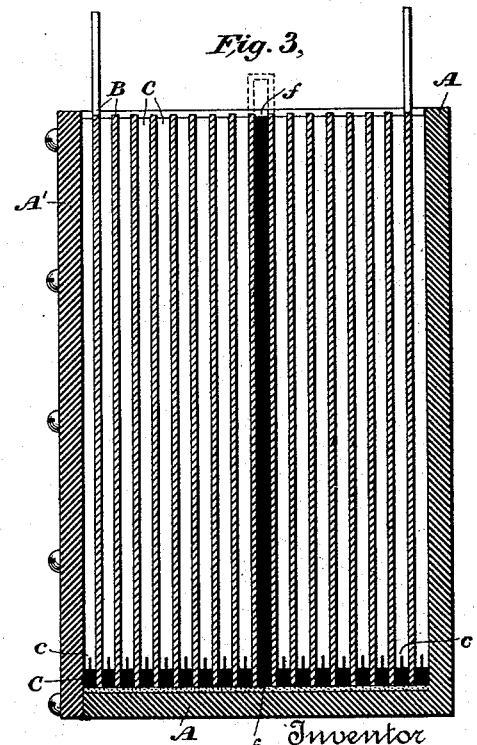
Witnesses
Geo. W. Breck
Edward Thorpe
Inventor
Harry E. Dey
By his Attorneys
Pope Edgcomb & Terry

UNITED STATES PATENT OFFICE.

HARRY E. DEY, OF NEW YORK, N. Y., ASSIGNOR TO PHOEBUS H. ALEXANDER, OF HYDE PARK, MASSACHUSETTS.

SECONDARY BATTERY.

SPECIFICATION forming part of Letters Patent No. 406,822, dated July 9, 1889.

Application filed February 16, 1889. Serial No. 300,162. (No model.)

*To all whom it may concern:*

Be it known that I, HARRY E. DEY, a citizen of the United States, residing in New York, in the county and State of New York, have invented certain new and useful Improvements in Storage-Batteries, of which the following is a specification.

The object of the invention is to provide a storage-battery which shall supply a high electro-motive force while occupying a small space.

The invention consists in placing the plates of the battery, which are all precisely alike, in more or less close juxtaposition, carefully and thoroughly insulated from each other and equally insulated from the sides of the case or receptacle which holds them, by which means the plates become, as it were, the sides of the several cells thus formed, and also whereby each plate in the process of forming becomes positive on one side and negative on the other. The series of plates may be broken as often as desired by the interposition of an insulating-plate, and the series of cells thus formed may be themselves joined in series or otherwise, as may be required for use.

The invention is illustrated in the accompanying drawings, in which—

Figure 1 shows a perspective of a case containing a battery embodying the invention. Figs. 2 and 3 are sectional views thereof, and Fig. 4 shows the insulating-piece used for separating the plates.

The plates of the battery may be of any of the usual forms that have a body of solid material—that is, the plates may be recessed or their surfaces prepared in any way most desirable to hold the active material, but there must be a solid body throughout the plate. The plates may be simply sheets of lead, and the battery may be formed by the simple process of charging and discharging by the method of Planté, or the plates may be artificially formed by any of the methods of applying active material to the surface.

A convenient method of preparing the battery is illustrated in the drawings. A case, as A in Fig. 1, is prepared, one side of which, as A', is removable. The battery-plates are made of a width somewhat less than the width of the interior of the case, and they are laid within the same, each separated by a piece of rubber or other insulating material, shaped as shown in Fig. 4. The case A is filled with the plates B, arranged alternately with the section of rubber C, which insulates them perfectly from each other, and as the plates are made narrower than the inside of the case a space is left along each side between the edges of the plates and the sides of the box. When the box is filled in this manner, the side A' is screwed to its place, compressing the plates and the insulating-pieces strongly, so that the spaces between the plates are made perfectly tight. The case being thus filled, the spaces along each side of the plates between their edges and the side of the box are preferably filled with an insulating-cement D, which assists in making the series of cells perfectly tight and prevents short-circuiting through the sides of the case by preventing any moisture from reaching the outside of the plates. It will thus be seen that the spaces between the plates, as $b$, form perfect battery-cells, and when these are filled with the usual electrolyte and the battery suitably "formed" the electro-motive force, even of a small battery, becomes very high on account of the large number of plates thus collected into a small space. Each plate becomes positive on one side and negative on the other, the contents of each cell being kept separate from every other by the solid body of the plate itself. It will be observed that the two outside plates are each half-plates—that is, active on one side only.

The rubber divisions preferably have thin tongues projecting upward into the cells, as $c$ $c$, which prevents short-circuiting of the cells by fallen material, as the latter will fall on one or the other side of the tongue C. Grooves formed in the rubber divisions would serve the same purpose.

Central insulating-pieces may be used, as at $e$, extending partially or entirely to the bottom of the cells, for keeping the plates properly separated.

In Fig. 3 an insulating-plate is shown inserted at $f$, dividing the battery into two series.

I am aware that it has been proposed to construct a battery by arranging a series of plates horizontally within a hermetically-sealed inclosing box or casing, the horizontal plates extending across and forming partitions within said casing; and I do not lay claim to such construction and arrangement of parts.

I claim as my invention—

1. The combination, with an open box or case, of a series of smaller vertically-arranged battery-plates of a width less than the interior of the case, insulating-strips between the sides and lower ends of said plates, thereby forming cells between the plates, and an insulating and water-proof cement filling between the sides of the case and the edges of the plates.

2. The combination of a box or case, a series of similar battery-plates of width less than the interior of the case, insulating-strips between the sides and lower ends of said plates, thereby forming cells between the plates, and an insulating and water-proof cement filling between the sides of the case and the edges of the plates.

3. The combination of a series of battery-plates arranged with insulating-divisions between them, said divisions being made moisture-tight, whereby the spaces between the plates form cells for the electrolyte, and insulating-plates interspersed, whereby the battery is divided into two or more separate series.

In testimony whereof I have hereunto subscribed my name this 15th day of February, A. D. 1889.

HARRY E. DEY.

Witnesses:
DANL. W. EDGECOMB,
CAROLINE E. DAVIDSON.